(12) United States Patent
Sanctis et al.

(10) Patent No.: US 12,381,874 B2
(45) Date of Patent: Aug. 5, 2025

(54) TRANSFERRING AUTHENTICATION FROM AN EXTENDED REALITY ("XR") DEVICE

(71) Applicant: Bank of America Corporation, Charlotte, NC (US)

(72) Inventors: Jennifer Sanctis, Charlotte, NC (US); Mary Bangs, New York, NY (US); Veronica Andrea Cadavid, New York, NY (US); Taylor Farris, Hoboken, NJ (US); Trish Gillis, Chicago, IL (US); Jesse James Godley, Charlotte, NC (US); Brian Meyers, New York, NY (US); Vishwas Korde, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 199 days.

(21) Appl. No.: 18/219,146

(22) Filed: Jul. 7, 2023

(65) Prior Publication Data
US 2025/0013725 A1    Jan. 9, 2025

(51) Int. Cl.
*H04L 9/40* (2022.01)
*G06F 21/32* (2013.01)
*H04L 65/403* (2022.01)

(52) U.S. Cl.
CPC .......... *H04L 63/0861* (2013.01); *G06F 21/32* (2013.01); *H04L 65/403* (2013.01)

(58) Field of Classification Search
CPC ..... H04L 51/04; H04L 51/52; H04L 63/0861; H04L 65/403; G06F 21/32
See application file for complete search history.

(56) References Cited

U.S. PATENT DOCUMENTS

| | | | |
|---|---|---|---|
| 11,080,705 B2 * | 8/2021 | Damania | G06Q 20/4014 |
| 11,869,017 B1 * | 1/2024 | Gaeta | G06Q 50/18 |
| 2010/0005293 A1 * | 1/2010 | Errico | G06Q 10/107 |
| | | | 713/170 |
| 2010/0229235 A1 * | 9/2010 | Dawson | H04L 9/3265 |
| | | | 713/171 |
| 2015/0150141 A1 * | 5/2015 | Szymanski | G06F 21/64 |
| | | | 726/26 |
| 2016/0217463 A1 * | 7/2016 | de Gouvea | G06Q 20/108 |
| 2023/0109544 A1 * | 4/2023 | Fletcher | H04L 9/3239 |
| | | | 713/168 |
| 2023/0245254 A1 * | 8/2023 | Ramoutar | H04L 9/3247 |
| | | | 705/80 |

(Continued)

*Primary Examiner* — Boris D Grijalva Lobos
(74) *Attorney, Agent, or Firm* — Weiss & Arons LLP

(57) ABSTRACT

Systems and Method are provided for transferring authentication from an extended reality ("XR") device. The systems and method may include the XR device comprising a sensor, and a computing device in electronic communication with the sensor. The sensor may collect biometric information from a user. The computing device may assign a first authentication level based on the biometric information. The user may be prompted to sign or virtually sign a document. The sensor may record a video recording of the user signing the document. The computing device may create a digital file from the video recording and a token indicating the first authentication level and the biometric information. The computing device may embed the token into the digital file. The digital file with the embedded token may be transferred to a second party.

20 Claims, 6 Drawing Sheets

(56) References Cited

U.S. PATENT DOCUMENTS

2023/0247075 A1* 8/2023 Ramoutar ............... H04L 65/75
348/14.08
2023/0350999 A1* 11/2023 Irwin, III ................ G06F 21/32

* cited by examiner

TRANSFERRING AUTHENTICATION FROM AN EXTENDED REALITY ("XR") DEVICE

FIELD OF TECHNOLOGY

Aspects of the disclosure relate to technology for transferring authentication.

BACKGROUND OF THE DISCLOSURE

Extended reality ("XR") devices, which include both augmented reality ("AR") and virtual reality ("VR") devices are currently in use and can capture a user's actions. The XR devices may also be capable of capturing biometric information of a user. However, current XR devices may not be able to transfer a high-level of authentication, which may include captures of the user's actions and biometric information, to a location remote from the XR device.

Entities may be required to sign documents to conduct a transaction. For example, financial institutions may require an entity to sign a check or other documents needed to conduct a high-level transaction. These documents may require additional verification that the entity signed the document because of document importance. Conventionally verification is achieved by a notary public. The notary public may witness the entity sign the document. The notary public may seal the document with a stamp. The seal may be unique to the notary public. The seal may verify that the entity signed the document.

At times it may be inconvenient to locate a notary public when an entity desires to complete a transaction. Additionally, a notary public may charge a fee to the entity to utilize the notary public's services. Furthermore, it may be possible to maliciously copy a notary public's stamp and seal or otherwise maliciously impersonate a notary public.

Therefore, it would be desirable to obviate the need for a notary public being physically present when signing documents. It would be further desirable to utilize an XR device to provide the user with a high-level of authentication. It would be further desirable to enable an XR device to transfer the captured authentication to a second party.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
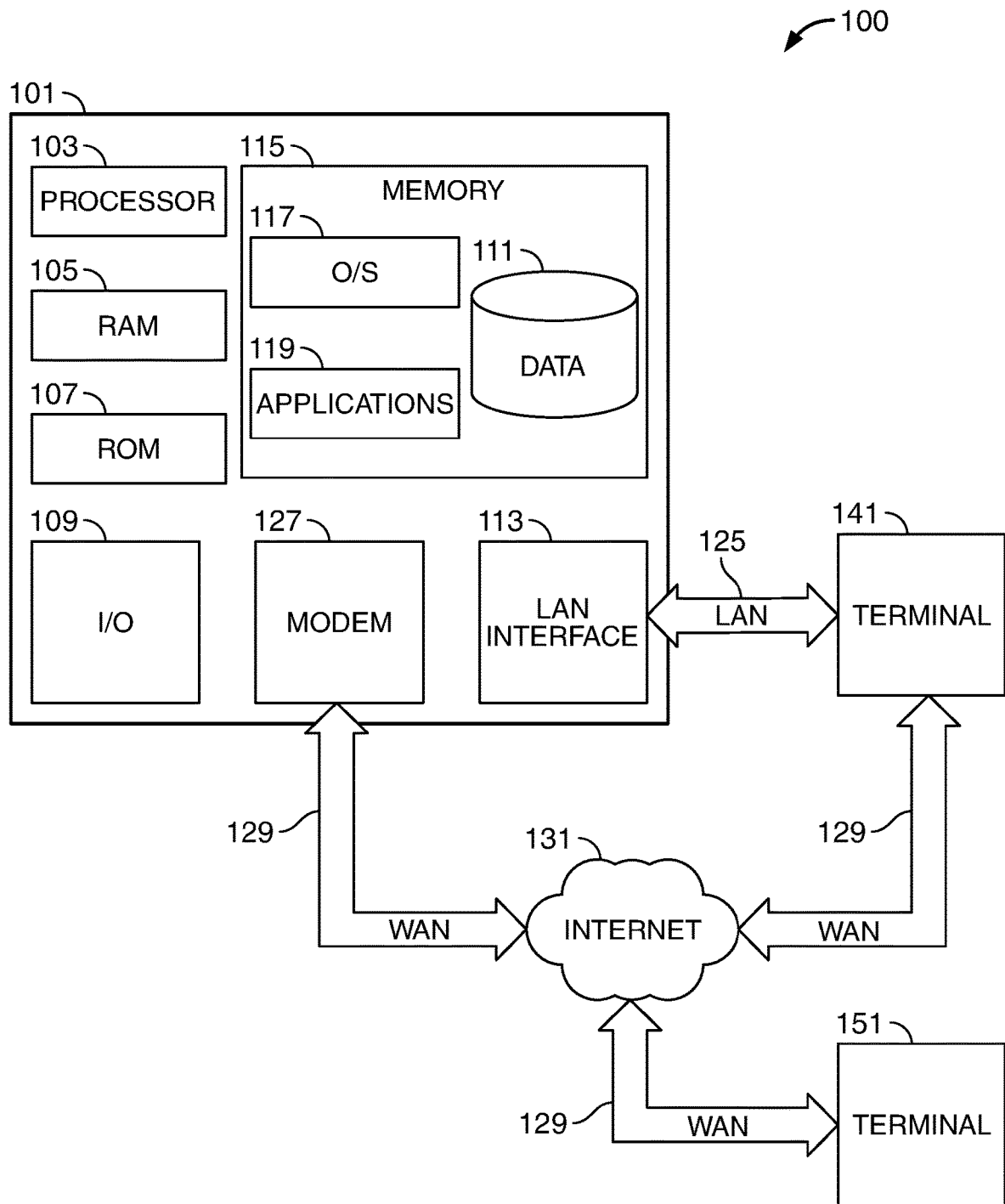
FIG. 1 shows an illustrative apparatus in accordance with principles of the disclosure.

Systems, apparatuses and methods are provided for transferring authentication from an extended reality ("XR") device. The XR device may include an augmented reality ("AR") device, a virtual reality ("VR") device and/or a device that can combine AR and VR environments. The XR device may include a unique device identification ("ID"). The XR device may include a sensor that can capture biometric information of a user. The XR device may include a computing device that may run an XR session. The computing device may be in electronic communication with the sensor.

The XR device may include smart glasses, virtual reality headsets, smartphones and/or wearable devices. The XR device may also include any suitable smart device that is integrated into a user's home, vehicle or clothing.

The sensor may include any video recording device, capable of recording video, images and/or sounds. The sensor may include a plurality of sensors. The sensors may be placed on an externally facing surface of the XR device. The sensor may be placed on an internally facing surface of the XR device. The sensors may capture the biometric information by picture, video and/or a combination of picture and video. The sensors may be placed on different portions of the XR device. The various locations of the sensor may enable the XR device to record the user doing a plurality of user actions. Examples of such actions may include signing a document, reading a document or any other suitable actions. The sensors may be able to record a video of the entirety of the user, including the user's face, body and hands, while the user signs the document. The sensors may include a physical camera and a recording program. The recording program may be designed to record or capture a virtual video of the user signing the document within the XR session and/or a virtual image of the signed virtual document.

The XR session may be defined as any interaction between a user and an XR device. A start of the XR session may be defined as a user powering the XR device or logging into an application within the XR device. The XR session may include AR sessions, VR sessions and/or a combination or both AR and VR sessions.

An AR session may include the user logging into an application installed on an AR device. An example of an AR device may be a smartphone. The AR device may display, to the user, the user's surroundings on the AR device's screen while including additional virtual objects within the surroundings. For example, when the user positions the AR device over a table, the user may view the table on the screen as well as a virtual document on the table.

A VR session may include the user powering a VR device. A VR session may include the user logging into an application installed on the VR device. The VR session may show the user a virtual environment. For example, the user may be able to see a virtual table and a virtual document on the virtual table.

In some embodiments, the computing device may be associated with and/or under the control of a notary public. The XR device may be associated with and/or under control of the notary public. The computing device may be able to connect to a network. The network may be the internet. A notary public may be able to access and/or control the computing device and/or the XR device over the internet. The XR device may include the computing device running an application. The notary public may connect to the application over the network. The notary public may also be connected to the XR session. The notary public may be able to control the XR session. The notary public may be able to access the sensors, included in the XR device, the computing device and/or one or more databases stored in a memory of the computing device through the application.

The systems and methods may include the sensor collecting biometric information of the user. The biometric information may be collected during the user login into the XR session. The biometric information may be any information unique to the user. For example, the biometric information may include a retinal pattern, a facial structure, a fingerprint and/or a voice pattern. The biometric information may be collected by a sensor embedded in the XR device. Such sensors may include an imaging sensor operable to capture a retina of the user, an imaging sensor operable to capture a facial structure of the user and/or an imaging sensor operable to capture a fingerprint of the user. The biometric information may be collected by a sensor, embedded in the XR device, operable to capture and collect an audio sample of the user.

The biometric information may include a liveliness capture. To prevent a third party from showing an image of the user to the sensor and pretending to be the user, the sensor may be able to obtain a liveliness capture of the user. The liveliness capture may include scanning the user for movements. The liveliness capture may also include prompting the user to perform a sequence of actions or motions. Examples of a sequence of motions may include instructing the user to blink three times then nod head. The liveliness capture may be any suitable liveliness capture.

The systems and methods may include the computing device assigning a first authentication level to the XR session. The first authentication level may be based on the collected biometric information. Once the XR session is assigned the first authentication level, any action operated within the XR session may be assigned the first authentication level.

There may be a plurality of different authentication levels. Each authentication level may be associated with the collected biometric information. For example, a first (low) level authentication may be assigned when a fingerprint is collected, a second (medium) level authentication may be assigned when a retinal scan is collected and a third (high) level authentication may be assigned when both a fingerprint and a retinal scan are collected.

User actions within the XR session may require different levels of authentication. For example, signing a low level document may require a low level of authentication, while signing a high-level document may require a high-level of authentication.

The systems and methods may include prompting the user to sign, or virtually sign, a document in response to assigning the first authentication level. The sensor may record, using a video recording, the user signing the document. The user may physically sign a physical document. The user may virtually sign a physical document. The user may virtually sign a virtual document. The sensor may capture the user signing the document in a video recording, whether the signing takes place in a physical setting, a virtual setting or a combination of a physical setting and a virtual setting.

In some embodiments of an AR session, the AR device may display, to the user, a virtual document positioned on a physical table. The user may virtually sign the virtual document using a pen, a stylus, a finger or any other method that would enable the AR device to capture the signature of the user signing the document. The captured signature may be virtually placed on the document. In some embodiments of an AR session, the user may virtually sign a physical document and the AR device may capture the signature of the user signing the document. The AR device may then add the virtual signature to a virtual document created by imaging the physical document. In some embodiments of an AR session, the user may physically sign a physical document and the AR device may capture both the user signing the document and the signed document. The sensors, embedded in the XR device, may include a virtual sensor. The virtual sensor may capture videos and images of interactions within the AR session. For example, the sensors may include a physical camera positioned to capture the user signing the document. The sensors may also include a recording program. The recording program may be designed to record the user virtually signing the virtual document in the AR session. The sensors may capture the user's signing motion. The sensor may be able to translate the captured user's signing motion into a virtual signature.

In some embodiments of a VR session, the VR device may display, to the user, a virtual document positioned on a virtual table. The user may virtually sign the virtual document using a stylus, a finger or any other suitable method that may enable the VR device to capture the signature of the user signing the document. The captured signature may be virtually placed on the document. Sensors, included in the VR device, may include a physical sensor. The physical sensor may be able to capture physical videos and images of the user signing the document. The sensors, including in the VR device, may include a virtual sensor. The sensors may capture videos and images of interactions within the VR session. For example, the sensors may include a physical camera positioned to capture the user's motion of signing. The sensors may also include a recording program designed to record the user virtually signing the virtual document in the VR session. The sensors may also capture the user's signing motion. The sensors may be able to translate the captured user's signing motion into a virtual signature.

The systems and methods may include the computing device creating a digital file from a video recording, captured by a sensor. The digital file may include the video recording from a physical camera and/or a recording from a recording program.

The systems and method may include the computing device creating a token. The token may indicate an authentication level (such as the first authentication level), qualifications of the notary public (such as the term "notary public", the name of the notary public, the state in which the notary public is commissioned, the county in which the notary public is commissioned, the registration number of the notary public and the date in which the commission expires), captured biometric information and a device ID (the device ID may identify the computing device). The systems and methods may include embedding the token into the digital file.

The XR device may store the qualifications of the notary public in a database located within the computing device. The qualifications of the notary public may be embedded in the token because the XR device is under the control of the notary public. The qualifications of the notary public may vary with different entities. The qualifications of the notary public may include some or all of the following: the term "notary public", the name of the notary public, the state in which the notary public is commissioned, the county in which the notary public is commissioned, the registration number of the notary public and the date in which the commission expires. The notary-level authentication may vary with different entities and with different notary publics.

The systems and methods may include in response to embedding the token into the digital file, the notary public may be prompted to verify that the identified authentication level, such as the first authentication level, satisfies a notary-level authentication. The notary public may also embed another token into the digital file indicating that the first authentication level satisfies a notary-level authentication.

Once the notary public verifies that the authentication level satisfies a notary-level authentication the digital file may be transferred to a second party. In some embodiments the second party may verify the qualifications of the notary public. The second party may compare the qualifications of the notary public with those stored in an entity database associated with the entity that commissioned the notary public.

The systems and methods may include sensors, included in a VR or AR device, capable of capturing an image of the signed document. The signed document may be placed in the digital file with the video recording. The sensors may capture the image of the signed document whether the signed document is virtual or physical. The sensors may also include a physical camera positioned to capture a physically signed document and/or a recording program designed to capture a virtually signed document from an AR or VR session.

The notary public may require a higher level of verification than verification obtainable by biometric information. In such an instance, the XR device may be able to collect biometric information in conjunction with an entity issued identification card. The sensors may include at least two sensors. Each sensor may include a camera or other device for capturing video and images. A first of the at least two sensors may image the face of the user while a second of the at least two sensors may image the user's identification card. The image of the first sensor may be simultaneous to an image of the second sensor.

The image of the user's face may be compared with an image of the user's face on the image of the user's identification card. The comparison may be made using a facial structures comparison algorithm. The facial structures comparison algorithm may be executed within the XR device. The facial structures comparison algorithm may be integrated in, or separate, from the computing device. The facial structures comparison algorithm may be remote from the XR device. The facial structures comparison algorithm may be controlled by the notary public.

The systems and methods may include collecting information on the user's identification card. The information may include the user's entity issued identification number, date of birth, address or other suitable personal information. The information may be compared with information stored in a user profile database. The information in the user profile database may be stored in a secure manner prior to the instantiation of the XR session. The user profile database may be created by the entity which issued the identification card. The user profile database may be under the control of the entity which issued the identification card The systems and methods may include assigning the first authentication level only when the image of the user's face achieves a threshold match to the user's face on the image of the identification card and when information on the user's identification card achieves a threshold match to information stored in the user profile database. The threshold match may be set by the facial structures comparison algorithm. The threshold match may be a 95% or greater percentile match. The threshold match may be any suitable percentage.

The systems and methods may include the sensors capturing secondary information. The secondary information may include a time, date and/or location of the user. The secondary information may be embedded in the digital file before the digital file is transferred to the second party. The secondary information may be used to identify whether the identified location is a location the user normally frequents, and/or whether the time/date is a time/date the user is normally active. The secondary information may be compared with normative secondary information stored in a user profile database. Normative secondary information may include information indicating locations, times and/or dates which a user normally frequents and/or is normally active. The user profile database may be under the control of the notary public.

The systems and methods may include prompting the user, during the user login, to select a set of biometric information to be collected by the sensors. The user may select which biometric information is collected based on the authentication required by one or more of the following: notary, second party, government and/or type of document to be transferred. The user may select the biometric information to be collected by the sensors based on the XR device and/or the information that is available to the user.

The systems and methods may include the user being prompted during the user login to select an authentication level, such as the first authentication level. Each level of authentication may require differing levels of biometric information to obtain the identified level of authentication. The user may select the first authentication level based on the authentication required by the notary, second party, government and/or type of document to be transferred. The user may select an authentication level based on the XR device available to the user. The user may select an authentication level based on selected biometric information to be collected. Once the authentication level is selected, predetermined biometric information may be collected to achieve the selected authentication level.

In some embodiments, the systems and methods may not require a notary public to be associated with and/or control the computing device of the XR device. The XR device may collect biometric information during a user login into an XR session. The computing device may assign an authentication level to the XR session based on the collected biometric information. The user may be prompted to sign, or virtually sign, a document after the authentication level has been assigned. The sensors may record a video recording of the user signing the document. The computing device may create a digital file from the video recording. The computing device may create a token indicating the authentication level, the biometric information and the device ID. The computing device may embed the token into the digital file. The computing device may transfer the digital file with the embedded token to a second party. The second party may be prompted to verify that the first authentication level satisfies a notary-level authentication. The second party may send a notification to the user upon verification.

In some embodiments, the second party may be able to verify that the first authentication level obtains the standards of a notary-level authentication without the need for a notary public. The second party may accept the signed document without a notary-level authentication. The biometric information embedded in the digital file, along with the video recording in the digital file may be sufficient documentation that the user signed the document.

In some embodiments, the second party may verify the authentication level by comparing biometric information embedded in the digital file with biometric information linked to the user, stored in a user profile database. The user may provide the biometric information to the user profile database in a secure manner prior to the instantiation of the XR session. The second party may verify the authentication level when the compared biometric information achieves a threshold match. The comparison of the biometric information may be performed by a device or method executing a comparison algorithm. The comparison algorithm may compare the collected biometric information to a set of stored biometric information. The stored biometric information may be specific to each type of biometric information, for example a retinal pattern, a facial structure, a fingerprint and/or a voice pattern. The threshold match for each type of biometric information may be 95% or any suitable threshold match.

In some embodiments, the second party may verify the authentication level by comparing the device ID embedded in the digital file with a device ID associated with the user stored in a user profile database. The user may provide the device ID to the user profile database in a secure manner prior to instantiation of the XR session. In such embodiments the computing device may verify the biometric information before assigning the authentication level. Once the biometric information is verified by the computing device, the computing device may assign the authentication level to the XR session.

The computing device may verify the biometric information by comparing the collected biometric information with biometric information stored in a user profile database. The user profile database may be located within the computing device. The comparison may be made using a comparison algorithm for comparing biometric information. The comparison algorithm may be within the XR device and/or may be integrated in, or in electronic communication with the computing device. The comparison algorithm may be required to achieve a threshold match. The threshold match for each type of biometric information may be 95% or any suitable threshold match.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computer system" or "computing device." Elements of apparatus 100, including computer 101, may be used to implement various aspects of the systems and method disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101, e.g., the operating system 117 and applications 119 such as an automatic data layering program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as an automatic data layering program and security protocols) along with any other data 111 (e.g., historical data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as an automatic data layering program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refers to applications located on a server remote from a user, wherein some or all the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for an automatic data layering program and security protocols, as well as other programs. In an embodiment, one or more programs, or aspects of a program, may use one or more AI/ML algorithm(s). The various tasks may be related to analyzing and categorizing various data to layer the data according to levels of access.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
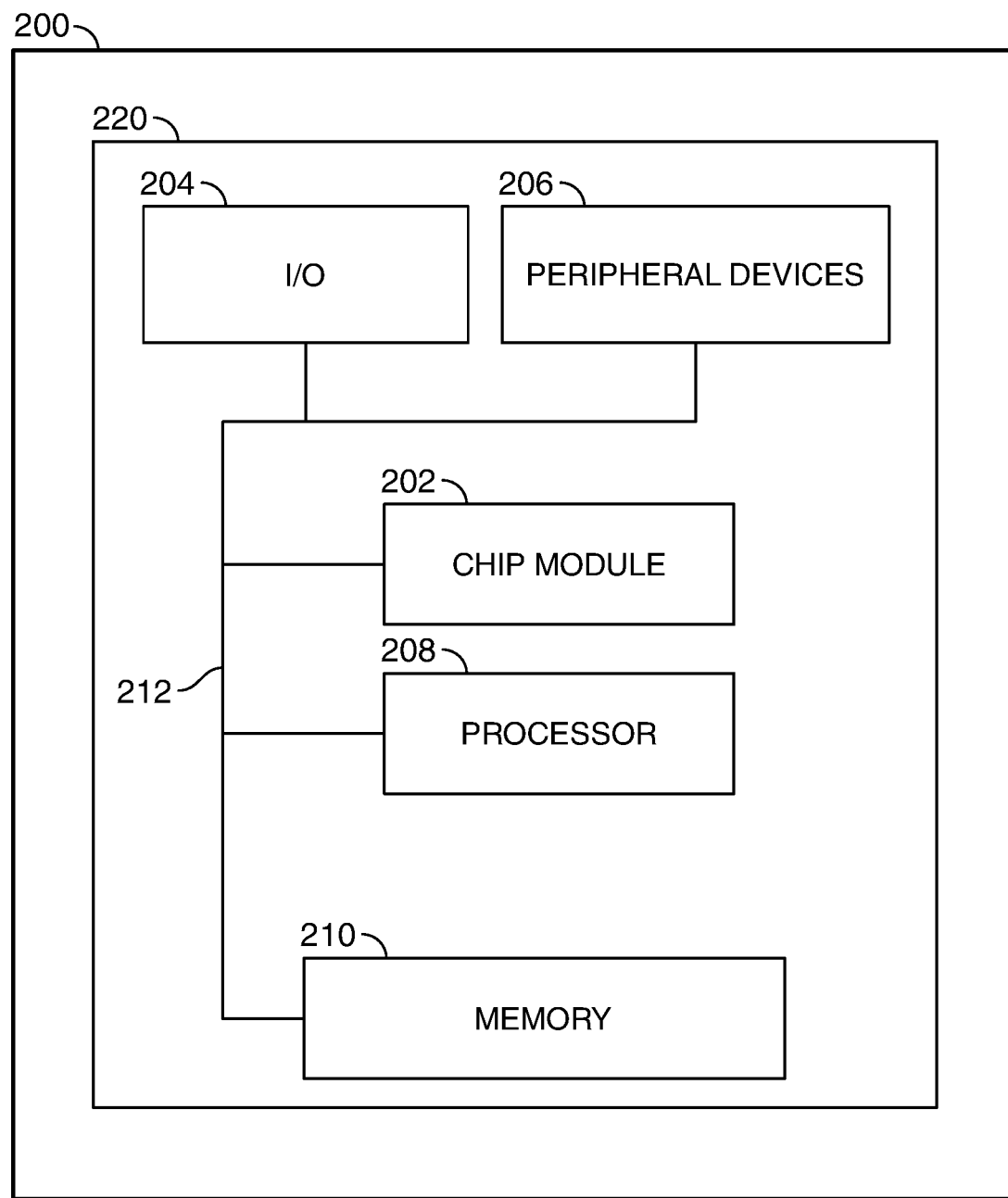
FIG. 2 shows another illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
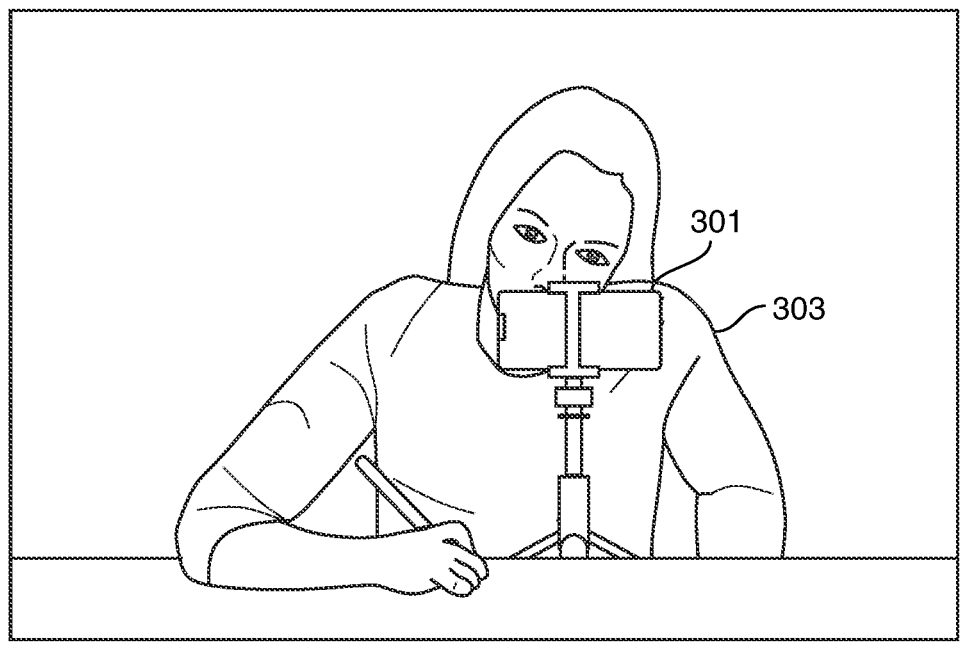
FIG. 3 shows an illustrative diagram of a user in an XR session in accordance with principles of the disclosure.

FIG. 3 shows an embodiment of a user in an XR session in accordance with principles of the disclosure. In FIG. 3, user 303 is shown virtually signing a virtual document using an AR device 301. An augmented reality image of the document is shown to user 303. The augmented reality image is displayed on AR device 301. The augmented reality image of the document may be shown on AR device 301 as lying on a surface near the user 303. User 303 may then virtually sign the document by moving the user 303's hands over the virtual document in the same motion as when signing a physical document. The motion may be captured by a sensor of AR device 301. The motion may be captured by a smart stylus held by user 303.

Figure 4:
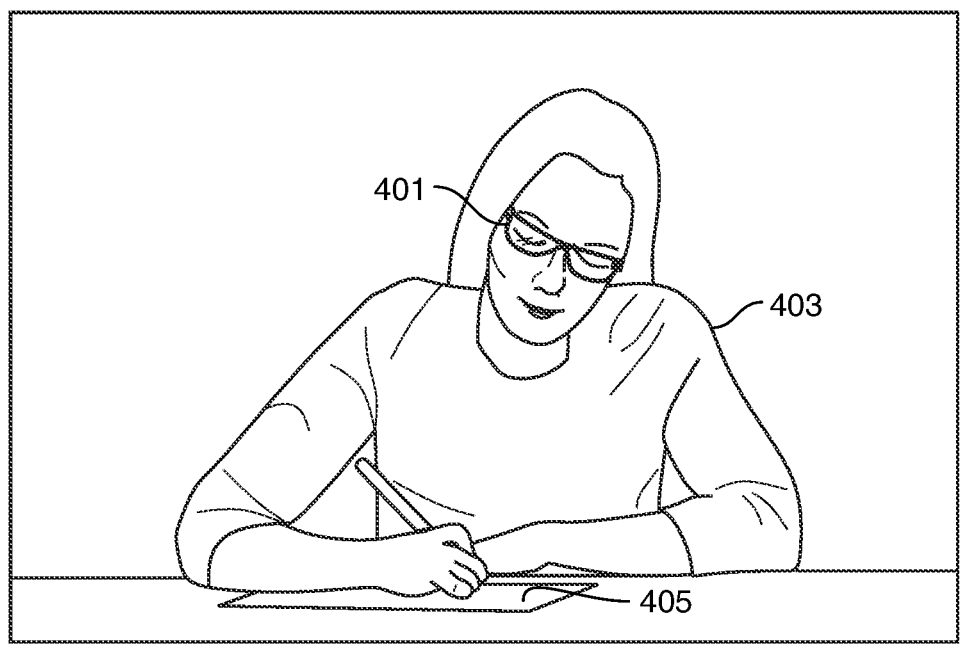
FIG. 4 shows another illustrative diagram of a user in an XR session in accordance with principles of the disclosure.

FIG. 4 shows an embodiment of a user in an XR session in accordance with principles of the disclosure. In FIG. 4, user 403 is shown virtually signing, or physically signing, a physical document 405 using an AR device 401. User 403 may sign document 405. The signature may be captured by the sensor of AR device 401. User 403 may virtually sign document 405 by moving the user 403's hands over the virtual document in the same motion as when signing a physical document. The motion may be captured by the sensor of the AR device 401. The motion may be captured by a smart stylus held by the user 403.

Figure 5:
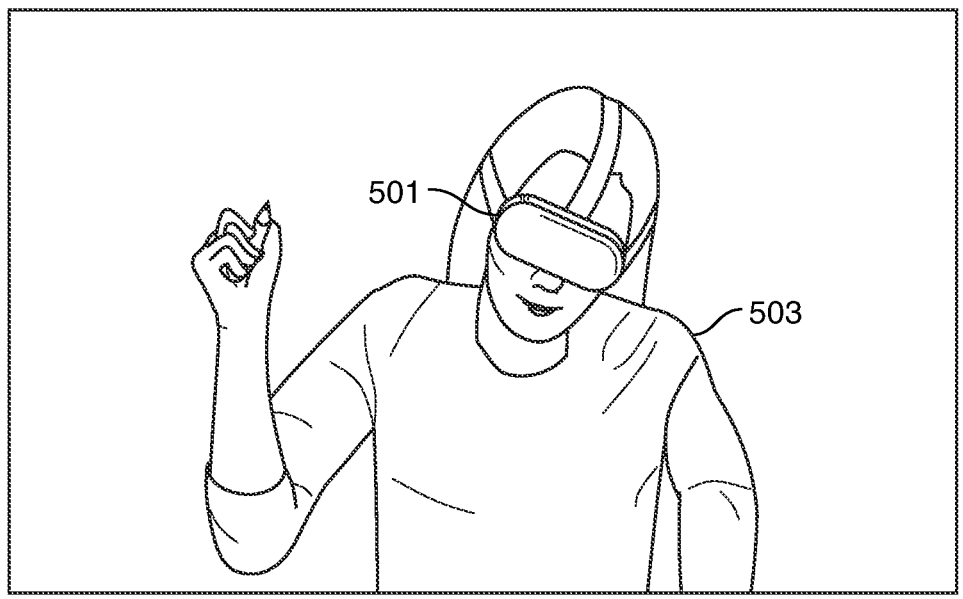
FIG. 5 shows yet another illustrative diagram of a user in an XR session in accordance with principles of the disclosure.

FIG. 5 shows an embodiment of a user in an XR session in accordance with principles of the disclosure. In FIG. 5, user 503 is shown virtually signing a virtual document using a VR device 501. User 503 may be in a virtual environment shown to user 503 by VR device 501. In the virtual environment there may be a virtual document that requires a signature by user 503. User 503 may virtually sign the document by moving user 503's hands over the virtual document in the same motion as when signing a physical document. The motion may be captured by a sensor of VR device 501. The motion may be captured by a smart stylus held by user 503.

Figure 6:
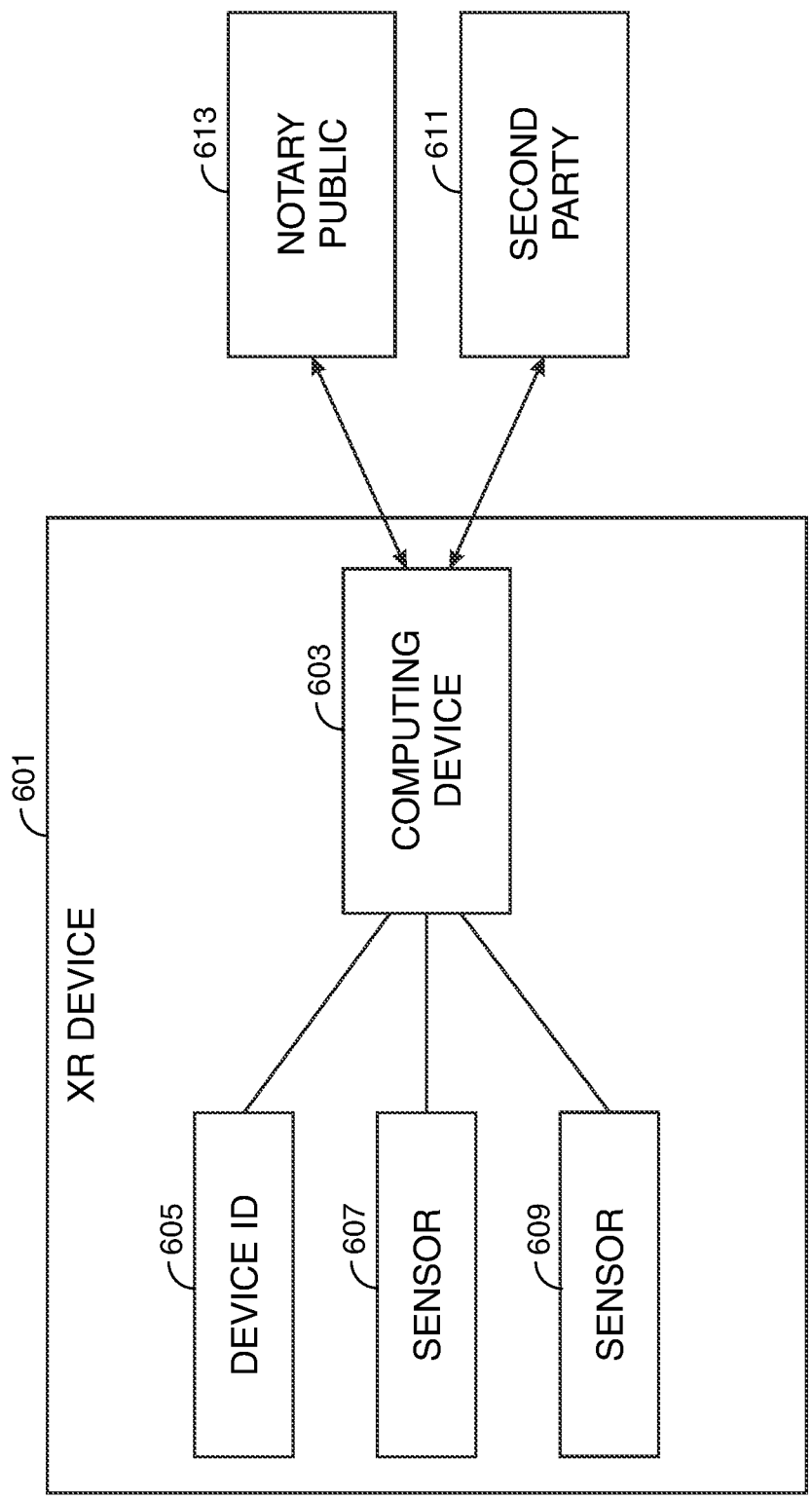
FIG. 6 shows an illustrative system in accordance with principles of the disclosure.

FIG. 6 shows an illustrative example of a system according to principles of the disclosure. XR device 601 may include computing device 603, device ID 605, sensor 607 and/or sensor 609. Computing device 603 may include computing device 101. Sensor 607 may include one or more sensors. Sensor 609 may include one or more sensors. Computing device 603 may be in communication with a second party 611 through internet 131, terminal 141 and/or terminal 151. Computing device 603 may be in communication with notary public 613 through internet 131, terminal 141 and/or terminal 151.

Figure 7:
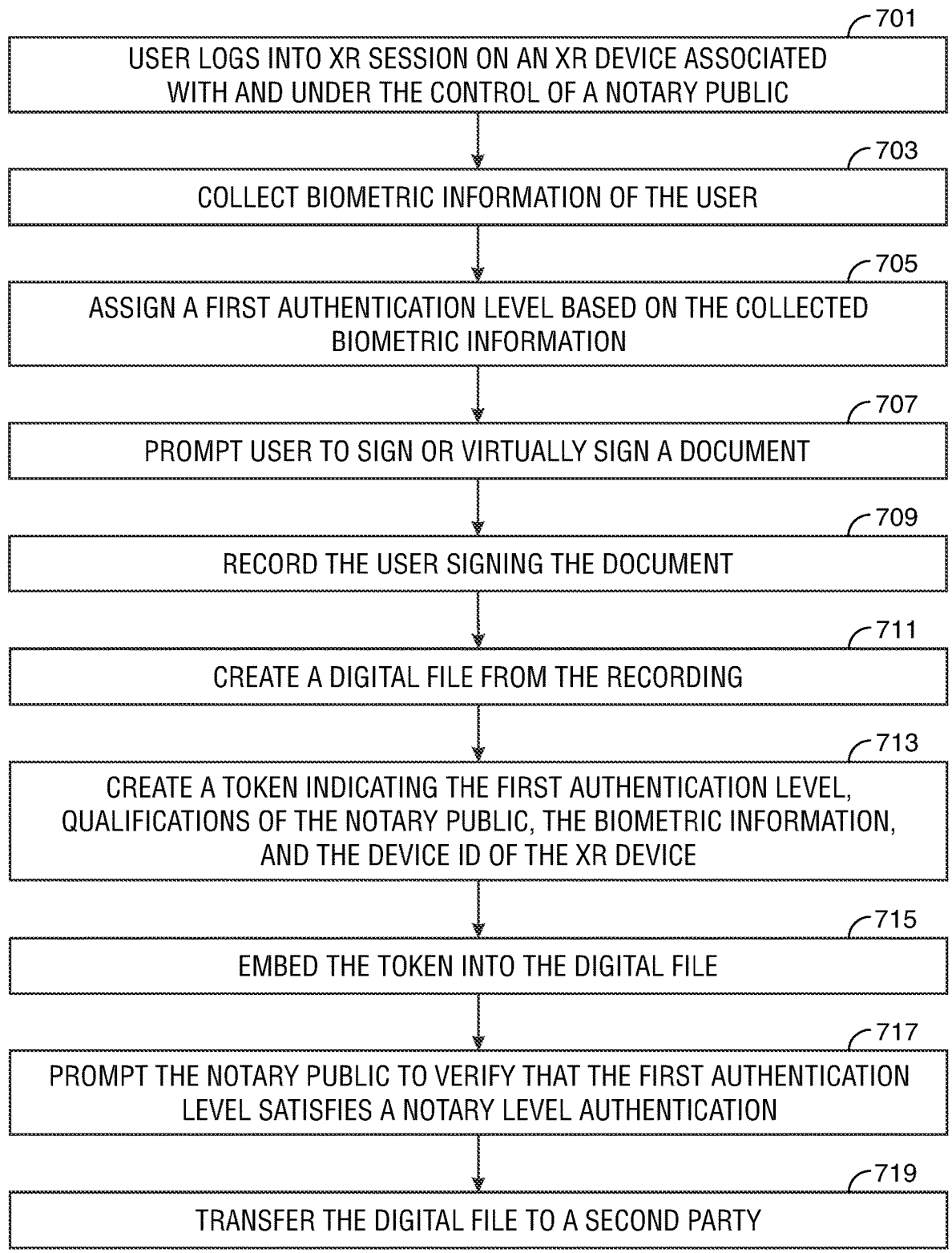
FIG. 7 shows an illustrative flowchart in accordance with principles of the disclosure.

FIG. 7 shows an illustrative flowchart in accordance with principles of the disclosure. At step 701, methods may include a user logging into an XR session on an XR device. At step 703, methods may include a sensor of the XR device collecting biometric information of the user. At step 705, methods may include a computing device of the XR device assigning a first authentication level to the XR session. The first authentication level may be based on the collected biometric information. At step 707, methods may include prompting the user to sign or virtually sign a document. At step 709, methods may include recording the user signing the document. At step 711, methods may include creating a digital file from the recording. It should be noted that steps 709 and 711 may be integrated into one step or may be two separate steps. For example, the recording may be the same as the creation of a digital file.

At step 713, methods may include creating a token indicating the first authentication level, qualifications of a notary public associated with the computing device, the biometric information and/or the device ID of the XR device. At step 715, methods may include embedding the token into the digital file. At step 717, methods may include prompting the notary public to verify that the first authentication level satisfies a notary-level authentication. At step 719, methods may include transferring the verified digital file to a second party.

Thus, systems and method for TRANSFERRING AUTHENTICATION FROM AN EXTENDED REALITY ("XR") DEVICE have been provided. Persons skilled in the art will appreciate that the present invention can be practiced by other than the described embodiments, which are presented for purposes of illustration rather than of limitation, and that the present invention is limited only by the claims that follow.

What is claimed is:

1. System for transferring authentication from an extended reality ("XR") device, the system comprising:
the XR device comprising:
a device identifier ("ID");
a sensor configured to capture biometric information of a user; and
a computing device associated with and under the control of a notary public, the computing device configured to run an XR session, the computing device in electronic communication with the sensor;
wherein:
the sensor collects the biometric information during a user login into the XR session;
the computing device assigns, based on the biometric information collected, a first authentication level to the XR session;
the user is prompted, in response to the first authentication level being assigned, to sign or virtually sign a document, within the XR session;
the sensor records a video recording of the user signing the document;
the computing device creates a digital file from the video recording;
the computing device creates a token indicating the first authentication level, qualifications of the notary public, the biometric information, and the device ID;
the computing device embeds the token into the digital file;
in response to the computing device embedding the token into the digital file, prompting the notary public to verify that the first authentication level satisfies a notary-level authentication; and
the computing device transfers the digital file which has been verified by the notary public, with the embedded token, to a second party.

2. The system of claim 1, wherein:
the sensor is further configured to capture an image of the signed document; and
the digital file comprises the digital video recording of the user signing the document and the image of the signed document.

3. The system of claim 1 wherein the biometric information comprises at least one of a retinal pattern, a facial structure, a fingerprint, and a voice pattern.

4. The system of claim 1 wherein the XR device comprises one of smart glasses, a virtual reality headset, or a smartphone.

5. The system of claim 1 wherein the qualifications of the notary include the name of the notary public, the state in which the notary public is commissioned, the registration number of the notary public, the county in which the notary public is commissioned and the commission expiration date.

6. The system of claim 1, wherein:
the sensor comprises at least two sensors, each of the at least two sensors comprising a camera;
the sensor collecting the biometric information comprises imaging the face of the user with a first of the at least two sensors and, simultaneously, imaging an identification card of the user with a second of the at least two sensors; and
the computing device only assigns the first authentication level if the user's face achieves a threshold match to a picture of the user's face on the user's identification card and information on the user's identification card matches information stored in a database located within the computing device.

7. The system of claim 1, wherein:
the sensor is further configured to capture secondary information relating to a time, date, and location of the user; and
the captured secondary information is embedded in the digital file before being transferred.

8. The system of claim 1 wherein the user is prompted, during the user login before the biometric information is collected, to select the biometric information to be collected.

9. The system of claim 1 wherein the user is prompted, during the user login before the biometric information is collected, to select the first authentication level and in response to the selection, predetermined biometric information is collected to achieve the first authentication level.

10. A method for transferring authentication from an extended reality ("XR") device, the method comprising:
the XR device initiating an XR session, the XR device comprising:
a device ID;
a sensor configured to capture biometric information of a user; and
a computing device associated with and under the control of a notary public, the computing device configured to run the XR session, the computing device in electronic communication with the sensor;
the sensor collecting the biometric information of the user during a user login into the XR session;
the computing device assigning, based on the biometric information collected, a first authentication level to the XR session;
prompting the user, after the first authentication level is assigned, to sign or virtually sign a document, within the XR session;
the sensor recording a video recording of the user signing the document;
the computing device creating a digital file from the video recording;
the computing device creating a token indicating the first authentication level, qualifications of the notary public, the biometric information, and the device ID;
the computing device embedding the token into the digital file;
in response to the computing device embedding the token into the digital file, prompting the notary public to verify that the first authentication level satisfies a notary-level authentication; and
the computing device transferring the digital file which has been verified by the notary public, with the embedded token, to a second party.

11. The method of claim 10, wherein:
the sensor is further configured to capture an image of the signed document; and
the digital file comprises the digital video recording of the user signing the document and the image of the signed document.

12. The method of claim 10 wherein the qualifications of the notary public include the name of the notary public, the state in which the notary public is commissioned, the registration number of the notary public, the county in which the notary public is commissioned and the commission expiration date.

13. The method of claim 10, wherein:
the sensor comprises at least two sensors, each of the at least two sensors comprising a camera;
the collecting the biometric information step further comprises imaging the user's face with a first of the at least two sensors and, simultaneously, scanning the user's identification card with a second of the at least two sensors; and
the computing device only assigns the first authentication level if the user's face matches a picture of the user's face on the user's identification card and information on the user's identification card matches information stored in a database located within the computing device.

14. The method of claim 10, wherein the sensor is further configured to capture secondary information relating to a time, date, and location of the user; and
the method further comprises embedding the secondary information in the digital file before being transferred.

15. The method of claim 10 further comprises, prompting the user, during the user login before the biometric information is collected, to select the biometric information to be collected.

16. The method of claim 10 further comprising, prompting the user, during the user login before the biometric information is collected, to select the first authentication level and in response to the selection, predetermined biometric information is collected to achieve the first authentication level.

17. A system for transferring authentication from an extended reality ("XR") device, the system comprising:
the XR device comprising:
a device ID;
a sensor configured to capture biometric information of a user; and
a computing device configured to run the XR session, the computing device in electronic communication with the sensor;
wherein:
the sensor collects the biometric information of the user during a user login into the XR session;
the computing device assigns, based on the biometric information collected, a first authentication level to the XR session;
the user is prompted, after the first authentication level is assigned, to sign or virtually sign a document, within the XR session;
the sensor records a video recording of the user signing the document;

the computing device creates a digital file from the video recording;

the computing device creates a token indicating the first authentication level, the biometric information, and the device ID;

the computing device embeds the token into the digital file;

the computing device transfers the digital file with the embedded token to a second party;

the second party is prompted to verify that the first authentication level satisfies a notary-level authentication; and a notification is sent to the user upon verification by the second party.

18. The system of claim 17, wherein:

the sensor is further configured to capture an image of the signed document; and the digital file comprises the digital video recording of the user signing the document and the image of the signed document.

19. The system of claim 17 wherein the verifying that the first authentication level satisfies the notary-level authentication comprises comparing the biometric information embedded in the digital file with biometric information associated with the user stored in a user profile database to ensure a threshold match is achieved.

20. The system of claim 17, wherein:

the assigning the first authentication level comprises:

comparing the biometric information with biometric information stored in a database located within the computing device; and the computing device only assigns the first authentication level if the comparison achieves a threshold match; and the verifying that the first authentication level satisfies the notary-level authentication comprises ensuring the device ID embedded in the digital file matches a device ID associated with the user stored in a user profile database.

\* \* \* \* \*